(12) United States Patent
Lorch

(10) Patent No.: US 6,364,210 B1
(45) Date of Patent: Apr. 2, 2002

(54) SANITARY THERMOSTATIC VALVE

(75) Inventor: Werner Lorch, Schramberg (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 09/484,766

(22) Filed: Jan. 18, 2000

(30) Foreign Application Priority Data

Jan. 19, 1999 (DE) ......................................... 199 01 854

(51) Int. Cl.[7] .............................................. G05F 23/13
(52) U.S. Cl. ...................... 236/12.2; 4/677; 137/625.17
(58) Field of Search ........................ 137/625.17, 625.4; 4/676, 677; 236/12.2

(56) References Cited

U.S. PATENT DOCUMENTS

| | | | |
|---|---|---|---|
| 4,617,965 A | * 10/1986 | Lorch | 137/625.17 |
| 4,685,156 A | * 8/1987 | Brabazon | 4/677 |
| 5,025,983 A | 6/1991 | Akita | 236/12.2 |
| 5,058,804 A | * 10/1991 | Yonekubo et al. | 4/676 |

FOREIGN PATENT DOCUMENTS

| | | |
|---|---|---|
| DE | 196 51 132 A1 | 11/1995 |
| DE | 44 43 960 A1 | 6/1998 |
| EP | 03 92 441 A1 | 10/1990 |

* cited by examiner

*Primary Examiner*—William E. Tapolcal
(74) *Attorney, Agent, or Firm*—Duane, Morris, LLP

(57) ABSTRACT

A sanitary valve contains an inlet for cold water, an inlet for hot water and two outlets for mixed water. The valve contains a thermostat, which determines the mixed water temperature. For controlling the mixed water quantity leaving the valve a disk control is provided, which simultaneously forms a changeover device between the two outlets. For changeover purposes use is made of the actuator with which the quantity control is also implemented. On turning from the closed position in one direction one outlet is opened, whereas on turning in the opposite direction the other outlet is opened.

6 Claims, 4 Drawing Sheets

SANITARY THERMOSTATIC VALVE

Figure 1:
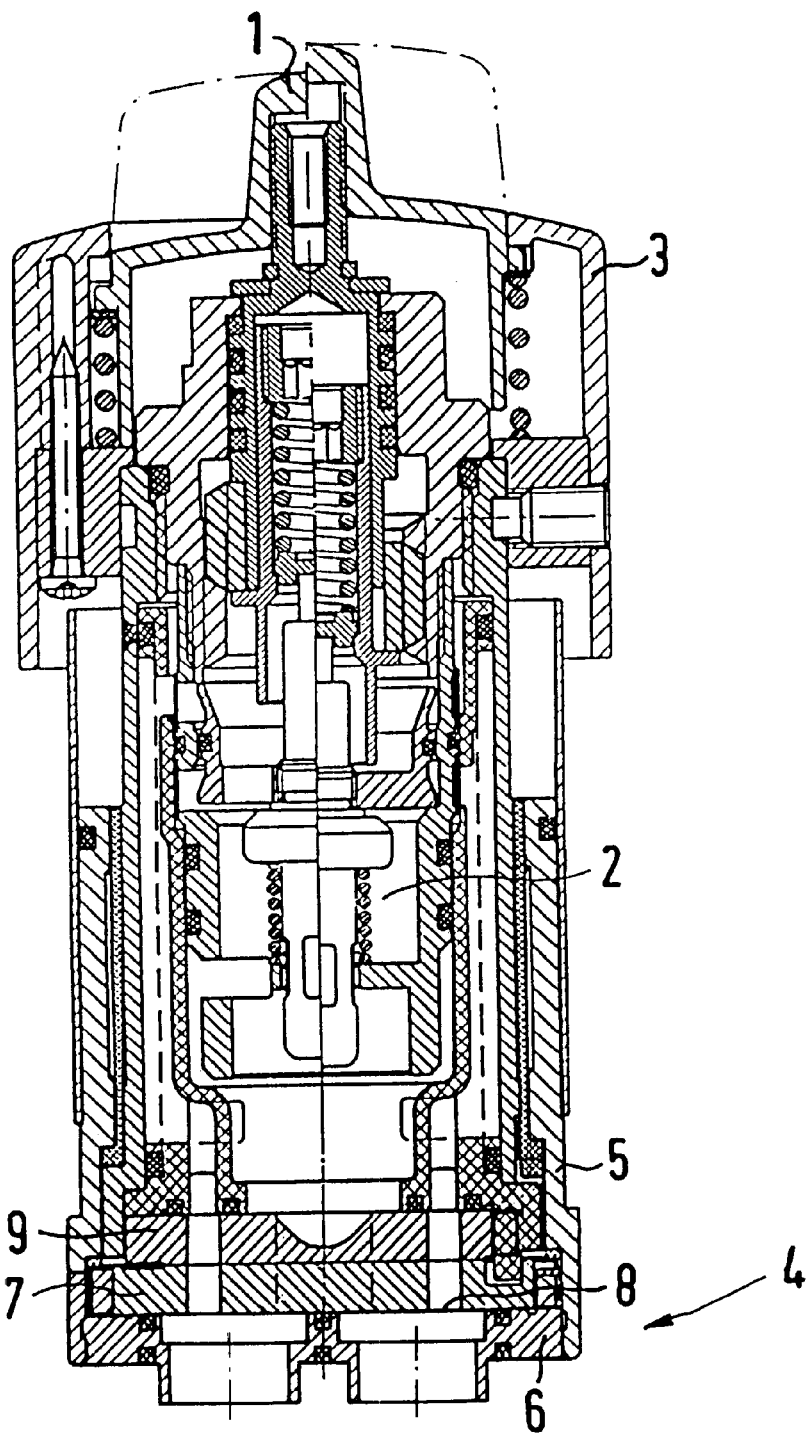

Thermostatic valves are used for the discharge of mixed water with a fixed set temperature. The temperature can admittedly be modified by changing a setting, but it normally remains set at a specific temperature. The element used during each use process consequently only serves to control the quantity of the water leaving the valve.

The problem of the invention is to provide a compactly constructed sanitary valve with two outlets.

According to the invention this problem is solved by a sanitary thermostatic valve having the features of claim 1. Further developments of the invention form the subject matter of the dependent claims, whose wording, like that of the abstract, is by reference made into part of the content of the description.

The thermostatic valve contains the actual thermostat, which is normally set once and for all, together with an actuator for modifying the mixed water quantity. The valve also contains a changeover device in order to determine from which of the two mixed water outlets the water is discharged. The changeover device can e.g. be controlled in such a way that mixed water can be simultaneously discharged from both outlets.

According to a further development, the changeover device is constructed for the operation of one of the two mixed water outlets, as desired.

According to a further development of the invention, the changeover device is integrated into the quantity control, so that the valve can have an even more compact construction.

It is possible to have separate actuators for the changeover and the quantity control. However, the invention more particularly proposes that the changeover device can be actuated by the actuator for the quantity control. It can involve a different type of handling of said actuator or a handling in the same way as for the quantity control, but extending beyond a specific position.

It has proved particularly advantageous to actuate in such a way that from the closed valve position an opening of one or other mixed water outlet can be brought about by adjusting the actuator in one direction or the other.

According to a further development of the invention, for quantity control purposes the flow cross-section both when the water enters the valve and when it leaves the valve is modified.

According to the invention, the valve quantity control has a disk control, in which is preferably also integrated the changeover device. Disk controls e.g. have a fixed, ceramic disk and an also ceramic control disk movable with respect thereto, the flow cross-section being determined by a greater or lesser overlap of the openings in the two disks.

According to the invention, the fixed control disk can have an inlet opening for cold water, an inlet opening for hot water and in each case one mixed water opening for each mixed water outlet from the valve.

According to the invention, the arrangement of the openings in the fixed control disk is symmetrical to a line, particularly a diameter line.

According to a further development of the invention, the movable control disk has two pairs of passage openings for hot and cold water, which can also be symmetrically positioned.

The movable control disk can have a port for the mixed water.

The cold water port advantageously diametrically faces the hot water port.

According to the invention, the water axially passes out through the disk control, both on entering the valve and on leaving it.

Further features, details and advantages of the invention can be gathered from the following description of a preferred embodiment of the invention and the attached drawings, wherein show:

FIG. 1 A longitudinal section through a valve cartridge for insertion in a fitting.

Figure 2:
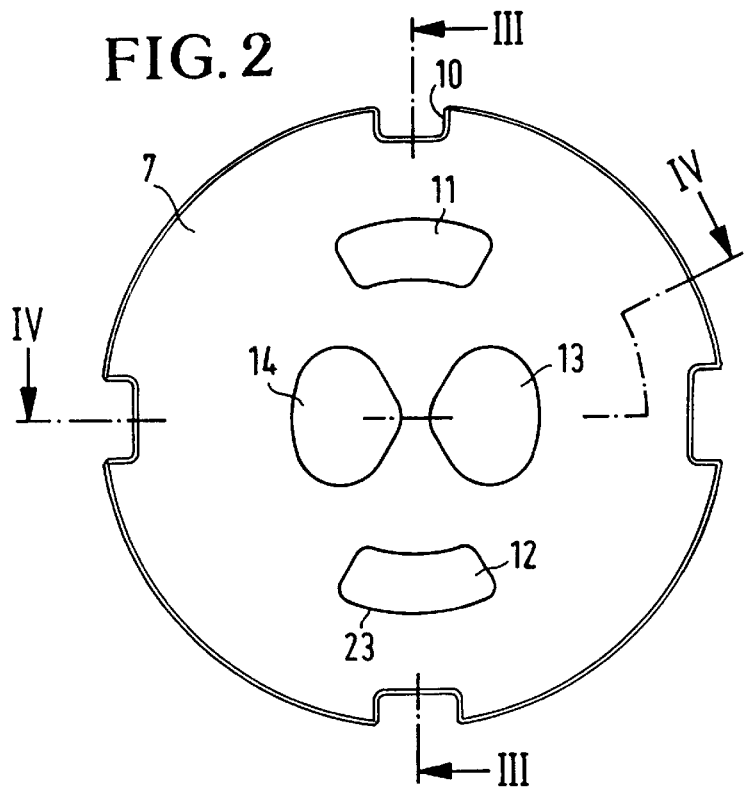

FIG. 2 A view of a fixed control disk.

Figure 3:
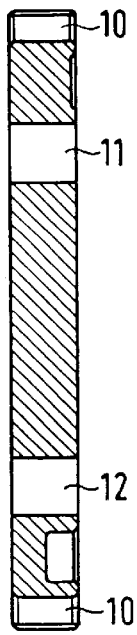

FIG. 3 A first section through the control disk of FIG. 2.

Figure 4:

FIG. 4 A second section through the control disk of FIG. 2.

Figure 5:
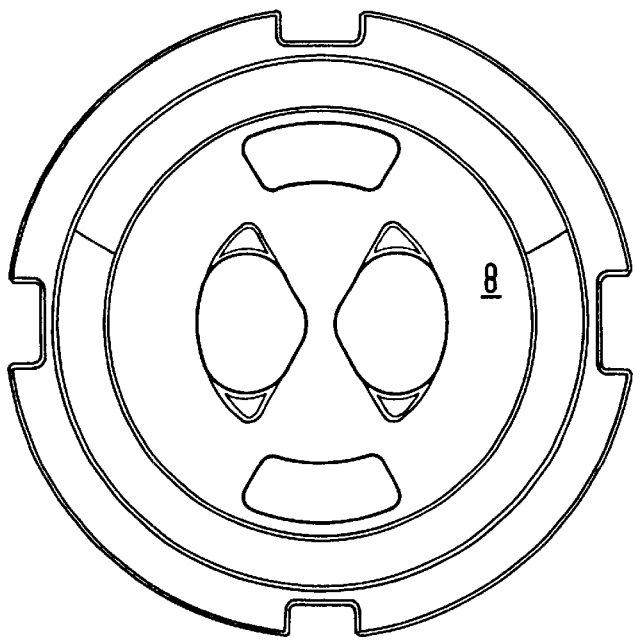

FIG. 5 A plan view of the fixed control disk of FIG. 2 from the opposite side.

Figure 6:
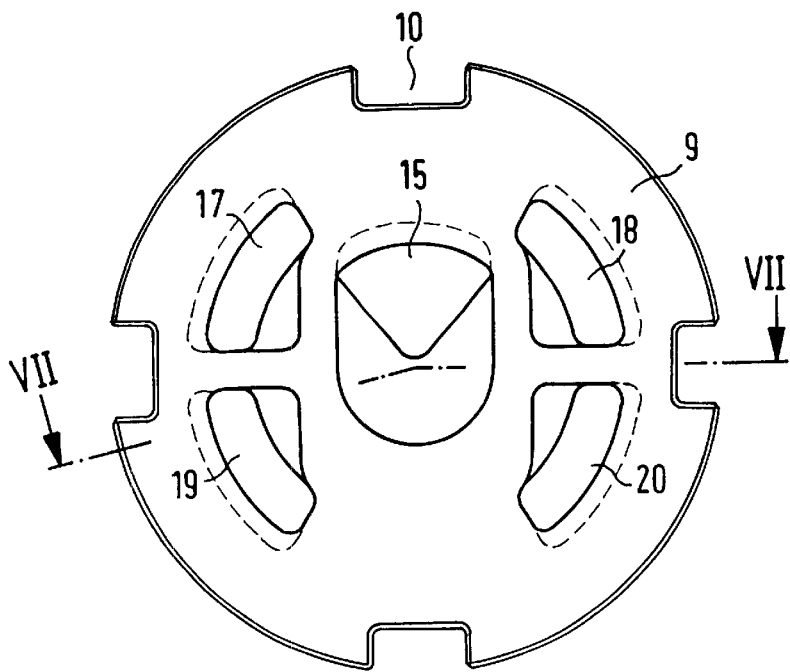

FIG. 6 A plan view from above of the movable control disk of FIG. 1.

Figure 7:
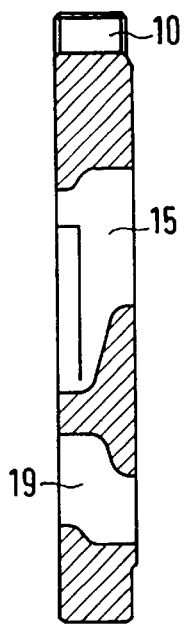

FIG. 7 A first section through the control disk of FIG. 6.

Figure 8:
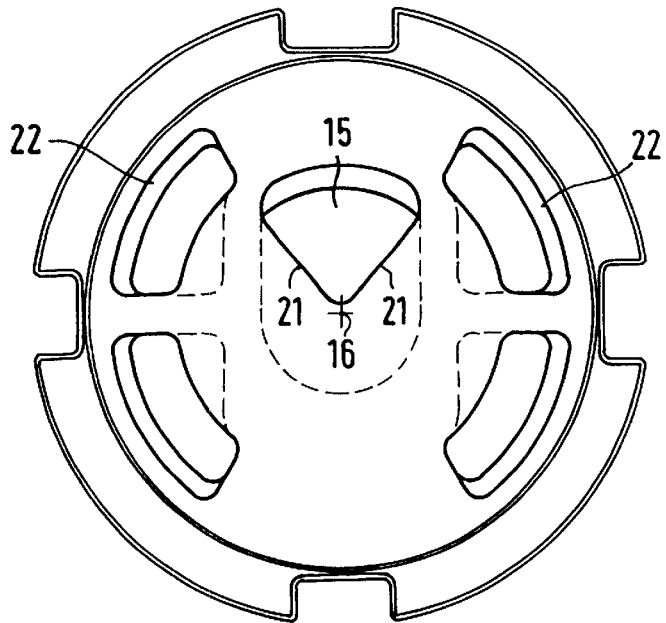

FIG. 8 A plan view of the movable control disk of FIG. 6 from the direction of the fixed control disk, i.e. from below in FIG. 1.

Figure 9:
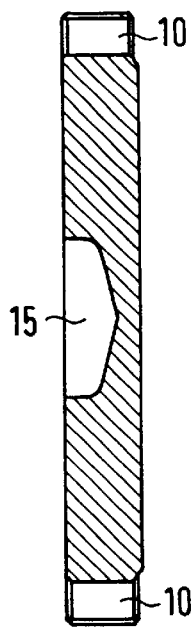

FIG. 9 A second section through the movable control disk of FIG. 6.

Figure 10:
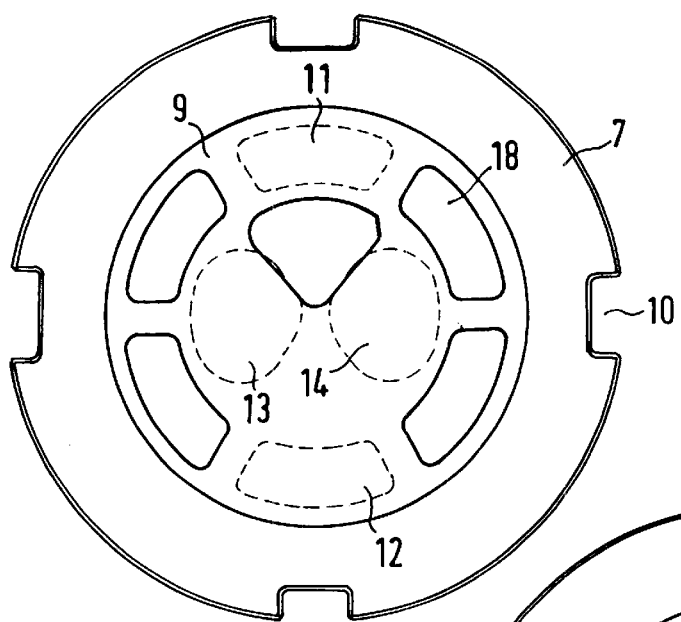

FIG. 10 Diagrammatically a view of the engaging control disks in the closed valve position.

Figure 11:
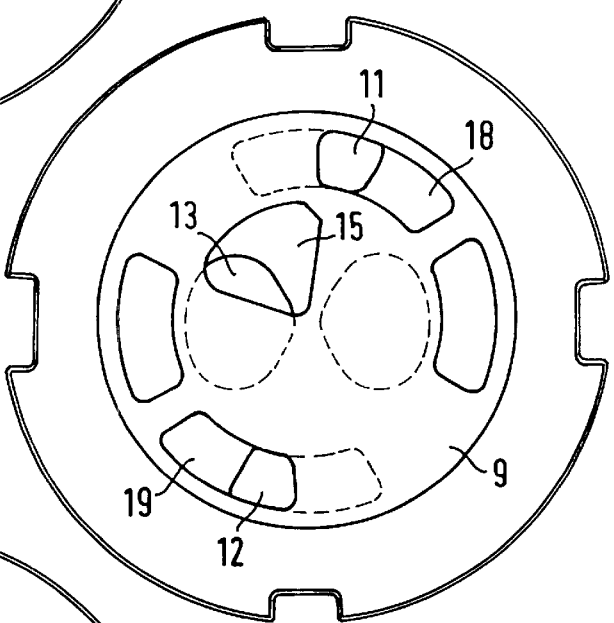

FIG. 11 A representation corresponding to FIG. 10 in the case of a partial opening of one mixed water outlet.

Figure 12:
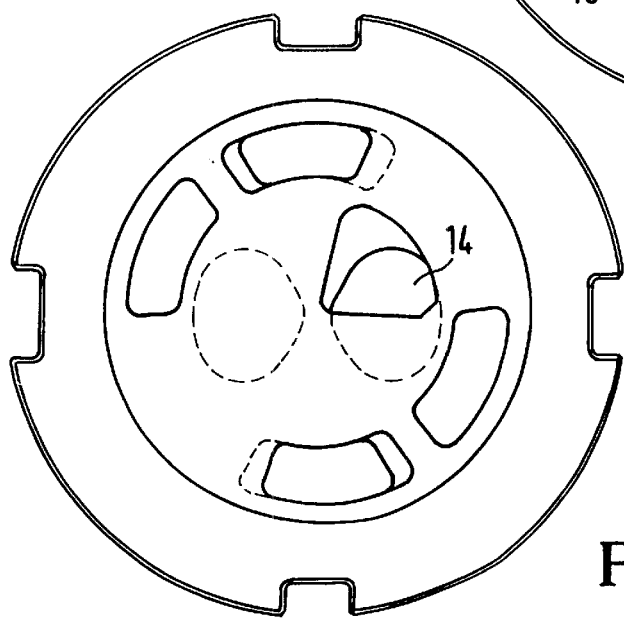

FIG. 12 A representation corresponding to FIG. 11 with a partial opening of the other mixed water outlet.

FIG. 1 shows an axial section through a valve cartridge according to the invention and on both sides of the axis the thermostatic valve is shown in different positions. The valve contains a first actuator 1 with which it is possible to set the desired temperature of the thermostat 2. The valve contains a second actuator 3 in the form of a control gap with which it is possible to control the water quantity leaving the valve. Details of the thermostatic valve are not described in greater detail, because they are known per se.

For controlling the mixed water quantity and for switching between the two outlets, the valve contains a disk control 4, which is placed in the cartridge above a base 6. The base serves to form the connection between the water passage within the cartridge and the fitting body in which the cartridge is inserted. The disk control contains a fixed control disk 7, which rests on the base 6. On the upper control surface 8 of the fixed control disk 7 in FIG. 1 is provided a movable control disk 9, which in the represented embodiment is also made from ceramic material. This movable control disk 9 can be turned with the aid of the actuator 3, so that it is possible to modify the mutual position of openings in the two control disks 7, 9.

FIG. 2 shows the fixed control disk 7 from the lower side in FIG. 1, i.e. from the direction of the base 6. The correct arrangement of the fixed control disk 7 in the cartridge 5 is ensured by notches 10 of differing width and which are located in the circumference of the control disk 7. The control disk has two through openings 11, 12, one being intended for the entry of cold water and the other for the entry of hot water. Both inlet openings 11, 12 extend as arcuate slots with concentric outer and inner edges over an approximately 45° arc. Both openings 11, 12 are arranged symmetrically to a diameter line connecting them and to a diameter line perpendicular thereto.

On a diameter line which is perpendicular to a line linking the two openings 11, 12 are located two outlet openings 13, 14, which are roughly tear-shaped and symmetrical in the manner described hereinbefore.

The section of FIG. 3 shows that the inlet openings 11, 12 just pass through the control disk 7.

A comparison of FIGS. 2 and 5 shows that the outlet openings 13, 14 issue differently into the two facing surfaces of the control disk 7. FIG. 5 shows the aforementioned control surface 8, i.e. that surface of the control disk 7 on which rests the movable control disk 9. FIG. 6 to 9 show the corresponding representations of the rotary control disk 9, but in a different scale. FIG. 6 is a plan view of the rotary control disk 91 from above in FIG. 1, i.e. from the side of the thermostat 2. In the outer circumference of the control disk there are once again notches 10, which serve to correctly position and move the control disk 9. The control disk 9 contains a port 15, which issues into the top of the control disk 9 as an oval opening, whereas it issues into the f acing underside as a circular sector. The apex of this circular sector extends roughly up to the central point 16 of the disk 9.

The control disk 9 also has two ports 17, 18 for cold water and two ports 19, 20 for hot water. The port 17 for the cold water is positioned diametrically to the port 20 for hot water and this also applies with respect to ports 18, 19. Here again the ports 17 to 20 are arranged symmetrically to the two diameter lines which are perpendicular to one another. One of these diameter lines coincides with the angle by sector between two linear lateral edges 21 of the port 15. The slightly inclined outer edges 22 of the ports 17 to 21 passing through the control disk 9 are located on the same radius as the corresponding outer edges 23 of the inlet openings 11, 12 in the fixed control disk 7.

The operation of the valve is best illustrated by the diagrammatic FIGS. 10 to 12, which show the fixed control disk 7 with a movable control disk 9 resting on it, said control disk 9 only being shown in simplified form, i.e. without the edge having the notches 10. FIG. 10 shows the movable control disk 9 in a starting position, in which the inlet openings 11 and 12 of the fixed control disk 7 are completely closed by the movable control disk 9. For example, the inlet opening 11 is for cold water and the inlet opening 12 for hot water. The port 15 of the rotary control disk 9 overlaps in its marginal area to a certain extent with the two outlet openings 13, 14 of the fixed control disk. However, this has no influence, because no water can enter the valve. If the movable control disk 9 is now turned counterclockwise in FIG. 10 with the aid of the actuator 3, the position shown in FIG. 11 is obtained. The port 18 for the cold water in the movable control disk 9 partly overlaps with the cold water inlet opening 11. The same applies for the two openings 19 and 12. The cold water can flow through the port 18 to the thermostat 2 and in the same way the hot water flows through the port 19. From the thermostat 2 the mixed water flows back to the port 15 from where it can flow out into the outlet opening 13. Depending on the extent to which the disk 9 is rotated counterclockwise, more or less water at the set temperature flows to one outlet from the valve. If the actuator 3 is now turned in the opposite direction, the quantity of water flowing out through the opening 13 decreases to zero. In the central position according to FIG. 10 the valve is closed. In the case of further clockwise rotation the position of FIG. 12 is assumed, where consequently the mixed water can flow out of the second outlet opening 14. The two maximum positions, i.e. the maximum opening positions of the outlets can be limited by stops. Both the quantity control and the changeover device between the two outlets are integrated into the disk control, which leads to a valve cartridge with a very compact construction.

What is claimed is:

1. Sanitary thermostatic valve comprising a cold water inlet, a hot water inlet, two mixed water outlets, a thermostat for fixing the mixed water temperature, a quantity control for controlling the mixed water quantity and a changeover device for switching between the two mixed water outlets, wherein the quantity control has a disk control including a fixed control disk and a movable control disk wherein the fixed control disk has an inlet opening for cold water, an inlet opening for hot water and in each case one outlet opening for each outlet from the valve.

2. Valve according to claim 1, wherein the arrangement of the openings in the fixed control disk is symmetrical.

3. Sanitary thermostatic valve comprising a cold water inlet, a hot water inlet, two mixed water outlets, a thermostat for fixing the mixed water temperature, a quantity control for controlling the mixed water quantity and a changeover device for switching between the two mixed water outlets, wherein the quantity control has a disk control including a movable control disk and wherein the movable control disk has two pairs of ports for cold and hot water.

4. Sanitary thermostatic valve comprising a cold water inlet, a hot water inlet, two mixed water outlets, a thermostat for fixing the mixed water temperature, a quantity control for controlling the mixed water quantity and a changeover device for switching between the two mixed water outlets, wherein the quantity control has a disk control including a movable control disk and wherein the movable control disk has a passage opening for hot water.

5. Valve according to claim 1, wherein the arrangement of the ports in the movable control disk is symmetrical.

6. Valve according to claim 3, wherein the ports for cold and hot water diametrically face one another in pairs.

* * * * *